United States Patent
Freundlich et al.

(12) 
(10) Patent No.: US 6,300,469 B1
(45) Date of Patent: Oct. 9, 2001

(54) PRODUCTION OF REDUCED GAS-PERMEABLE POLYALKYLENE TEREPHTHALATE FILMS BY STRAIN INDUCED CRYSTALLIZATION

(75) Inventors: Richard Freundlich, New York, NY (US); Rudy Nwana, Piscataway; Glenn Mathus, Dover, both of NJ (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 58 days.

(21) Appl. No.: 09/646,762

(22) PCT Filed: Mar. 30, 1999

(86) PCT No.: PCT/US99/06897

§ 371 Date: Nov. 28, 2000

§ 102(e) Date: Nov. 28, 2000

(87) PCT Pub. No.: WO99/50334

PCT Pub. Date: Oct. 7, 1999

Related U.S. Application Data

(63) Continuation of application No. 09/050,198, filed on Mar. 30, 1998

(60) Provisional application No. 60/079,797, filed on Mar. 30, 1998.

(51) Int. Cl.[7] .................................. C08F 6/00; C08J 5/00
(52) U.S. Cl. ...................... 528/503; 528/481; 264/209.1; 264/209.6; 264/209.8; 264/211.12; 264/DIG. 62; 264/331.12
(58) Field of Search .................................... 528/481, 503; 264/209.1, 209.6, 209.8, 211.12, 331.11, DIG. 62

(56) References Cited

U.S. PATENT DOCUMENTS 4,034,055 * 7/1977 Strutzel et al. .......................... 264/95
5,344,912 * 9/1994 Dalgewicz, ll et al. .......... 528/308.1

* cited by examiner

Primary Examiner—Samuel A. Acquah
(74) Attorney, Agent, or Firm—Thomas C. Lagaly

(57) ABSTRACT

PET with low gas permeability and good mechanical properties is produced utilizing strain-induced crystallization. This strain-induced crystallization process is utilized to produce PET films and sheets, among other products.

6 Claims, 1 Drawing Sheet

PRODUCTION OF REDUCED GAS-PERMEABLE POLYALKYLENE TEREPHTHALATE FILMS BY STRAIN INDUCED CRYSTALLIZATION

CROSS-REFERENCE TO RELATED APPLICATIONS

This is a continuation of provisional application Ser. No. 60/079,797 filed Mar. 30, 1998 and is a continuation of application Ser. No. 09/050,198 filed Mar. 30, 1998, each of which is relied upon and expressly incorporated by reference herein.

FIELD OF THE INVENTION

This invention relates to a process for producing polyethylene terephthalate (PET) with reduced gas permeability and good mechanical properties through strain-induced crystallization. In addition, the invention relates to the polyethylene terephthalate films and sheets produced utilizing this inventive method.

BACKGROUND OF THE TECHNOLOGY

Polyesters, namely poly(ethylene terephthalate) or PET, are widely used in the food package industry. The PET films compete commercially with multilayer structures consisting of ethylene vinyl alcohol copolymer (EVOH), polyvinylidene chloride (PVDC), or nylon were commonly used to produce films with reduced gas permeability. The multilayer films have a number of disadvantages. Films of PVDC require special handling during processing, and reprocess poorly. The barrier properties of films of EVOH degrade significantly with moisture.

In developing PET for food package industry applications, a major effort has been directed to reducing the gas permeability of the package, since a decrease in such permeability will lead to a longer shelf life of the food product. In addition, the dimensional stability and the heat stability of the film are relevant to storage at ambient temperature over long periods of time or upon heating (with contents) the contents in either microwave or conventional ovens. Equally important considerations and development (s) relate to the breakage of seals and warping due to excessive shrinkage of the container during retort or any of the thermal sterilization processes. The versatility of PET is, in part, attributable to its potential for crystallization. Amorphous polymers are optically clear, but because they are glassy in nature, they tend to lack the necessary ductility and toughness. A semi-crystalline polymer, while often very tough, is not optically clear because of the formation of large, light diffracting spherulite-type crystals.

Crystallization of PET occurs when the PET is cooled below $T_m$ [its melting temperature]. The thermodynamic driving force for nucleation increases as the polymer is cooled below the melting point. Thermal crystallization occurs with decrease in temperature unless the cooling rate is fast enough. Thermal crystallization produces spherulites, which are large, roughly spherical crystal superstructures composed of many crystal lamellae growing radially from the center. Because the size of spherulites is comparable to the wavelength of light, they scatter light and make the polymer look hazy, possibly even opaque. Once thermal cryallization occurs, it becomes much more difficult to stretch/form the polymer to any significant degree.

Stretching and orientation also produce crystals and crystallinity in PET. However, the crystals of stretching and/or orientation are not large round spherulites that form; rather, on stretching and/or orientation, numerous, very small oriented crystals result. Suc oriented crystals are too small to scatter light so a film/fiber remains clear. The resultant polymer tends to be very strong and tough.

Intrinsic viscosity, IV, a direct function of molecular weight, can affect crystallization. Higher IV results in a slower crystallization rate, and higher toughness. High melt viscosities, resulting from relatively higher molecular weight, can mean increased difficulties in manufacture and downstream processes.

Solution or intrinsic viscosity (IV) is a property which characterizes the polyesters. The technique for measuring IV involves measuring the time it takes for different concentrations of polymer in a solvent, usually 60/40 phenol/tetrachlorethane to pass through a viscometer relative to the flow time of pure solvent. It can be shown for PET that IV is directly related to the weight-averaged molecular weight ($M_w$).

The blown bubble extrusion process has been used in the past for producing PET film. This process utilizes a tube which is extruded from an annular die and then inflated with air to a size dictated by the film properties desired and equipment configuration. The polymer (e.g., PET) is then cooled with blown air or cascading water, and can be collapsed into a flat tube. The film is then wound into rolls of either slit or tubular film. As described, this single bubble blown film process moderately stretches and/or orients the PET. The PET must be melted for extrusion. For the film sheet industry melting is traditionally performed using single screw extruder. Polymer in the form of either pellets or powder, is fed into the feed hopper from dryers, where it is conveyed, melted and pumped to the die by the rotating action of a screw or multiple screws in the case of twin screw extrusion. PET resin is typically processed with barrel temperatures between 260 degrees C. and 300 degrees C. Higher IV resins require higher initial temperatures to compensate for the increased viscosities and to minimize torque requirements and die pressures. The conventional extruder should have an L/D (length /diameter) ratio of at least 24:1. Blown film processes involving only a single bubble, as is typical with polyethylene film production, result in minimal orientation. For double-bubble blown film air pressure is used to inflate a second bubble to orient the polymer [orientation in the first bubble is minimal since forming temperatures are too high].

The PET can be fed to the extruder in the blown film line as pellets. The pellets are produced utilizing conventional methods by melting the PET in a melt reactor from which it emerges as a low molecular weight resin. Solid state polymerization can be used to increase the molecular weight. For example, prior to pellet formation, the polyester can undergo a solid state polymerization, in tower reactors to increase IV, intrinsic viscosity, and/or molecular weight. The targets for commercial products, include IV of 0.75 to 0.85 for bottle applications; and IV of 0.85 to 1.1 is required for sheet product(s), thermoformed into shaped objects. The melt is then cooled through a water bath and processed into pellets. The rapid cooling of the melt creates an amorphous structure. Surface crystallization is needed prior to drying the polymer, because amorphous PET pellets will stick to each other during the drying processes. Prior to extrusion PET supplied as pellets or powder must be dried. The higher the IV, or the molecular weight, the more critical is the need for drying, as water leads to a significant drop in molecular weight as well as causing bubbles or voids in the final product.

To summarize the stages of production of PET film, pellets of PET are formed and crystallized on the surface; the pellets are extruded to form film; the film is oriented uniaxially or biaxially; the film can be heat set and crystallized.

SUMMARY OF THE INVENTION

In accordance with the invention crystallinity is imparted to a substantially amorphous PET during the extrusion process, e.g., before extrusion to blown film. By crystallinity we mean about 5 to 40 percent crystallinity. The amorphous PET may not be free of crystalline content since the processing conditions, leading to the extruder may induce crystallization.

The PET films produced utilizing the inventive process described herein have a number of properties superior to known films. The PET films of this invention have higher maximum use temperatures than the standard films. Moreover, the PET films produced through the process of this invention are lower in processing cost than the PET films produced on tenter frames.

The invention further includes the production of crystallized PET by utilization of strain-induced crystallization without the necessary use of additives and nucleating agents. However, such additives may be used to produce PET with targeted morphology and applications. Another object of this invention is to produce a crystallized PET film by inducing crystallization in the melt prior to pumping to the annular die. Still another object is to develop a method of producing PET films with reduced gas permeability and good mechanical properties through strain-induced crystallization. Yet another object of the invention is to produce a process for making PET pellets and sheets through strain-induced crystallization.

The broadest aspect of the invention can be expressed as a method of increasing the crystallinity of polyethylene terephthalate comprising:

melting substantially amorphous polyethylene terephthalate in an extruder having an adapter tube with a restricted portion;

cooling said melted polyethylene terephthalate in the adapter tube to crystallize said polyethylene terephthalate;

heating said cooled polyethylene terephthalate to a temperature less than the melting point of said cooled and heated polyethylene terephthalate; and processing said heated polyethylene terephthalate.

DESCRIPTION OF THE DRAWING

The FIGURE is a flow diagram of an adapter modified extruder which can be used in the invention.

DETAILED DESCRIPTION

Figure 1:
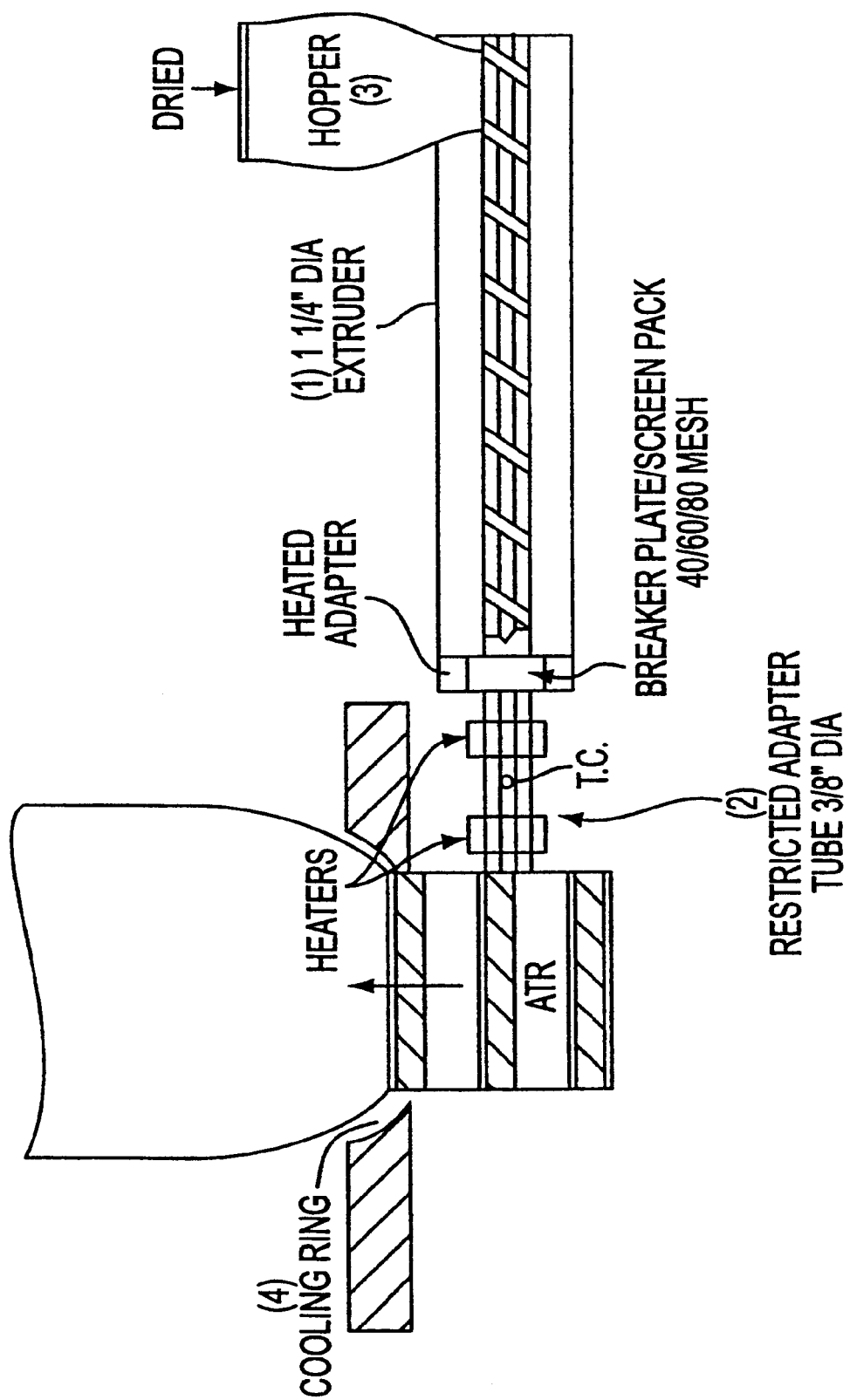

The crystalline polyester terephthalate (PET) the invention has a relatively high melting point. Because of the PET melting point and its dielectric properties, the films produced therefrom can be used in microwave ovens and in conventional oven cooking. The PET of the film exhibits high melt strength and high melt elasticity.

Moreover, the films exhibit a percent crystallinity of 5 to 40%, generally from 6 to 36%, preferably 7 to 22%. Excellent films can be made with PET having crystallinity of 7 to 18%. Thermal analysis, to determine crystallinity, was performed using a Perkin-Elmer DSC 7 using a sample size of approximately 5–10 mg for each film sample. A heating rate of 10 degrees C./minute was used for sample heating. Baseline onsets for the determination of melting and recrystallization enthalpies via numerical integration of the resulting endotherms and exotherms, respectively, were specified by the instrument operator. For the first heating run, the endotherm was measured as the sample was heated from 29 degrees C. to 287 degrees C. at 10 degrees C./minute. Then the sample was held at 287 degrees C. for one minute, and then cooled at −20 degrees/minute to 29 degrees C. to yield the recrystallization exotherm. Finally, the sample was subjected to the second heating run at a rate of 10 degrees C./minute until the sample reached 287 degrees C. The mass percentage crystallinity for each sample was calculated from the first heating data by subtracting the exothermic crystallization enthalpy from the final endothermic melting enthalpy and dividing the result by 125.58 J/g, the melting enthalpy for a perfect PET crystal, according to Progelhoff et al, "Polymer Engineering Principles:Process and Tests Design", C. Hanser Publishers, New York (1993).

Moreover, the films, produced in accordance with process of the invention, exhibit improved oxygen barrier properties, compared to films produced with other processes. Oxygen permeability was measured according to a standard test based upon ASTM D3985; and the crystalline films of the invention showed improvement over films based on amorphous PET; PET films, produced in accordance with the invention resulted in oxygen barrier properties improved by about 18% in relation to those properties in amorphous PET.

The PET films are further characterized by contact clarity. Contact clarity refers to the property of appearing clear when no air is between film and product. The films exhibit a haze of 9.7 to 55.8 (as measured by ASTM D-1003). Furthermore, the moderate to high crystallinity films are characterized by reduced blocking versus amorphous PET films. The films display zero shrink forces as measured on a test standard based upon ASTM D2838. When they are thermally stimulated to cause shrinkage, the shrink forces are equal in the transverse and machine direction(s). The film coefficient of friction was measured, based upon ASTM 1894 and showed improvement over films based on amorphous PET. Tensile properties were excellent; a procedure based upon ASTM D882-90 was used to make the tensile determinations. The tensile strength was calculated as the ratio of the peak force at break to the original sample cross-section area. The elongation at break for the sample was computed as the ratio (in percent) of the final specimen length to the initial specimen length:

Elongation at Break(%)=100% [Final Sample Length/ Initial Sample Length]. Surprisingly, at high crystallinity, the polymers of the invention exhibit superior elongation. The Young's or Elastic Modulus, E, in $(lb_f/in^2)$ was determined by multiplying the maximum initial slope of the load $(lb_f)$-displacement (in) curve by the factor $L_0/A_0$ where $L_0$ is the initial sample length in inches and $A_0$ is the initial sample cross-section area in $in^2$. The strength of the film is doubled compared to conventional PET films.

The films can be used in food packaging and protective coatings, even on steel and aluminum cans, oven bags, labels; tapes and lid stock. The films can be adhered to metal, such as aluminum or steel. The films of the invention may be self-supporting. Alternatively, films of the invention can constitute one lamina of a multilayer structure; accordingly, the films may be composited with a paper substrate, another PET substrate, or a substrate formed by other polymers such as, e.g., homopolymers and copolymers of ethylene, propylene and polyamide.

The films of the invention are made by a process which includes converting amorphous PET to crystalline PET blown film. The amorphous PET which is used in the process of the invention can be the polycondensation product(s) of C2 to C10 glycols, e.g. ethylene (glycol, propylene glycol; diethylene glycol; 2,2-dimethyl-1,3-propanediol; 1,4-butanediol; 1,4-cyclohexane dimethanol; 2,2,4-trimethyl-1,3-pentanediol; 2-methyl-2-propyl-1,3-propane diol; 1,3 butane diol; 1,5 pentane diol; 1,5-hexane diol; 1,8 octane diol; 1.9-nonane diol; 1,10 decane diol; 1,12-docecane diol; 1,2-cyclohexanedimethanol; 1,3-cyclohexanedimethanol; 2,2,4,4-tetramethyl-1,3-cyclobutane diol; 1,2-xylene diol; 1,3-xylene diol; and 1,4-xylene diol 1,4 butylene glycol, 1,4 cycloxylenglycol with terephthalic acid or reactive derivatives thereof e.g. dimethylterephthalate, as well as polycondensation products containing besides units derived from terephthalic acid also units deriving from other dicarboxylic acids such as naphthalene dicarboxylic acid, isophthalic acid, orthophthalic acid and 5-tert-butyl-1,3 benzene dicarboxylic acid in amounts from about 0.5 to 25 mole per cent of the total acid units. The process is particularly advantageous for alkylene terephthalates and copolyalkylene terephthalates utilized for injection molding, extrusion blow molding and extrusion application such as tubing, film sheets and foaming.

In a preferred embodiment of the process of the invention, starting PET has been upgraded, to increase IV and molecular weight, by admixing with an additive which is a dianhydride of an aromatic tetracarboxylic acid, para-mellitic dianydride. The foregoing is described in U.S. Pat. No. 5,334,669 at column 2 lines 22–46, which is relied upon and incorporated by reference herein. The exact processing to upgrade, by solid state IV upgrading is described in U.S. Pat. No. 5,334,669 at column 3 lines 1–50, which is relied upon and incorporated by reference herein. However, admixture of the aromatic tetracarboxylic acid can occur in the extruder. The most preferred PET is an additive modified PET from Sinco Engineering S.p.A., COBITECH™ PET, which allows a higher Intrinsic Viscosity (IV) to be reached in a shorter time than ordinary PET. COBITECH™ PET is known to have high melt strength and high melt elasticity. With COBITECH™ PET technology, a high molecular weight PET with high mechanical properties and solvent resistance can be produced at a lower cost than with conventional PET. Utilizing COBITECH™ PET, a process has been developed to produce foamed PET. See, for example U.S. Pat. Nos. 5,376,734, 5,670,584, 5,422,381, and 5,362,763, the entire specifications of which are incorporated herein by reference. We have also used COBIFOAM™ which contains only virgin PET, has an IV of 1.4 and FDA approval.

As stated above, the process of the invention broadly involves crystallization of amorphous PET. The levels of crystallinity can be controlled to achieve target crystallinities and oxygen barrier properties. In addition, the PET of the invention exhibits good sealing capacity; by comparison, higher crystallinity in PET results in film with relatively poorer seal properties. Thus the process of the invention comprises maintaining the sealing properties while balancing the coefficient of friction properties and blocking reduction. In particular the invention relates to a process of imparting crystallinity to the PET, prior to extrusion, by strain induced crystallization. The extruder is equipped with an adapter which provides a restriction between unrestricted zones upstream and downstream of the restriction in the extruder. In the description below, the restriction is defined as "aspect ratio." The process of the invention comprises subjecting amorphous PET to heating at a temperature which exceeds 254° C.; and crystallizing the heated PET, by simultaneously cooling the heated PET by decreasing the temperature applied to the melt by at least 10° C. and up to about 38° C. so that the applied temperature is in the range of 229° C. to 285° C.; and passing the PET, while said PET is being cooled, to an adapter which has an aspect ratio, defined as L/D wherein L is length and D is diameter and wherein the L/D has a numerical ratio of 16 to 21; and subjecting the PET to a pressure of 1500 to 6200 psi, to provide crystalline PET with a 5 to 40% crystalline content; and thereafter heating the crystalline PET in a die to a temperature of over 255° C. to less than the Tm (the PET melting point).

In a specific embodiment the COBITECH™ PET is melted and the COBITECH™ PET melt is then subjected to cooling in the restricted adapter tube to create a section of high stress; by comparison heating temperatures are elevated in the unrestricted zones of the extruder, compared to the relatively cooler temperatures in the adapter. Cooling of the PET in the adapter can be the result of not applying heat to the adapter. This cooling and stress causes the melt to crystallize and the back pressure to increase. Parenthetically, the pressure of 1500 to 6200 psi, is the result of the restriction in the adapter, which is used in the preferred embodiment of the application. Lower temperatures appear to favor improved oxygen barrier properties and increase in crystallinity, as explained below. The polymer is pushed through a spiral mandrel die where it is reheated under pressure. The most important factor appears to be the temperature of the cooling stage. The temperature range of applied cooling relates to the applied temperature; however, the exact temperature of the cooled PET may be plus or minus up to 10° C. different from the temperature of the applied cooling means, or the adapter. However, it has also been determined that 'take off speed'[TOS] has an affect on crystallinity in that increase in TOS results in an increase in crystallinity. Crystallization is also affected by the addition of controlled heating or cooling of the film as it exits the spiral mandrel film die and is blown into film.

The data reveal that as the adapter wall is cooled from above 285° C. to almost 266° C., the mass crystalline fraction in the resulting PET film first decreases to a minimum value of about 10% at 283° C., and then increases again with further cooling of the die adapter. Young's Moduli plots determined for the MD and TD directions for the films as a function of die adapter temperature also exhibit similar minima. Young's Modulus often demonstrates a monotonic increase with increasing levels of crystallinity for semicrystalline homopolymer and copolymers. Inferences about the tendency of adapter cooling to promote spherulite growth and development during blown film extrusion can be derived from an examination of the optical properties of the films embodied in the ASTM D 1003-92, the haze represents the fraction of incident light scattered at an angle greater than 2.5 degrees (wide angle scattering.) The total luminous transmittance (total transmission) is the fraction of incident light passing through the film within the solid angle subtended by 2.5 degrees. The data indicate that film haze increases as the die adapter wall temperature is dropped below 283° C. The film total transmission falls from a plateau of 92.5% for die adapter temperatures below 283° C. These results combined with the foregoing analysis of the film crystallinity, indicate that the crystalline morphology development at the higher adapter temperatures is of a smaller, more nucleated texture, whereas the crystal development in the films at the lower adapter temperatures is larger, and more spherulitic in nature. The evidence for this view is supported by the fact that the film optical properties were not degraded by the higher levels of crystallinity formed in the films for adapter temperatures greater than about 283° C.

Moreover, the process of the invention further includes the blown bubble extrusion process. For illustration purposes only, reference is made to the Drawing and elements set forth therein. A conventional 1-¼ inch diameter extruder (element 1 of the drawing) equipped with a conventional metering type screw is used. The collapsing panel of the tower has been changed from wooden flats to polytetrafluoroethylene rolls (not shown). The opening in the adapter tube (2) is restricted. For illustration purposes only, this opening has been restricted to ⅜ inch in diameter. The blow up ratio can be 1:1 or higher, 2:1 and 3:1; in fact film specimens produced at a BUR of 6:1 have been manufactured. A standard feed screw with ⅓ feed, ⅓ compression, and ⅓ metering sections may be used. Dried PET is fed from the hopper (3) to a conventional 1-¼ inch diameter screw extruder (1), in which the PET is heated to above 254° C. The melt is pumped to the adapter where the temperature is decreased and pressure increased, by virtue of the decrease in the diameter of the adapter to ⅜ inch; accordingly the melt is being pumped from a relatively unrestricted zone to a restricted zone. The melt, cooled in the adapter, is reheated to a temperature in the range of from 255° C., preferably 260° C., to less than the Tm (Tm being the PET melting point, which will increase with increasing crystallinity) for extrusion through the annular die (4) where the extrudate is air cooled by air rings and forms a tube, which is subsequently blown into a bubble by increasing the pressure within the tube; the bubble is collapsed and wound The cooled tube is then collapsed, creating a tape or a lay flat film. The film can be biaxially oriented as a result of the blown film process. The higher the BUR, the greater the orientation. The tape or sheet may be reheated and then reblown to increase orientation. Prior to the second blow, a coating die can be used to incorporate a layer of another-resin, such as PVDC and/or EVOH.

The PET of the invention can be used to form films of various thicknesses. The exact thickness will depend on the application. For example, films of 1 mil or less may be required in certain applications, whereas in other applications the film will of necessity have a thickness of 1 to 10 mils for drop in substitution.

The following examples are given to illustrate and not limit the invention.

EXAMPLES

Example 1

In accordance with the description set forth above, COBITECH™ PET was crystallized and blown into film. A conventional 1-¼ inch diameter extruder equipped with a conventional metering type screw was used. The opening in the adapter tube is restricted. For illustration purposes only, this opening has been restricted to ⅜ inch in diameter. A standard feed screw with ⅓ feed, ⅓ compression, and ⅓ metering sections was used. These features are shown in the drawing. The conditions and results are reported in the following TABLE A.

TABLE A

| | | | | | | | |
|---|---|---|---|---|---|---|---|
| | Data Analysis of PET Sample | | | | | | |
| Run | Factor A: Adapter T deg F | Factor B: TOS ft/min | Factor C: Air Ring % | Response Ten T Elong % | Response Ten M Elong % | Response TS TD × $10^3$ PSI | Response TS MD × $10^3$ PSI |
| 1 | 461.00 | 6.00 | 20.00 | 17.2 | 19.8 | 4.9 | 1.0 |
| 2 | 500.00 | 9.00 | 10.00 | 38.8 | 34.4 | 2.4 | 4.8 |
| 3 | 500.00 | 12.00 | 10.00 | 30.6 | 85.4 | 2.3 | 6.9 |
| 4 | 498.00 | 9.00 | 10.00 | 32.2 | 70.6 | 1.3 | 6.2 |
| 5 | 520.00 | 12.00 | 0.00 | 56.0 | 58.0 | 1.6 | 2.8 |
| 6 | 542.00 | 9.00 | 10.00 | 27.4 | 114.6 | 1.7 | 5.1 |
| 7 | 500.00 | 9.00 | 10.00 | 44.0 | 58.4 | 2.6 | 4.8 |
| 8 | 540.00 | 10.00 | 20.00 | 88.4 | 62.0 | 1.7 | 2.7 |
| 9 | 460.00 | 12.00 | 20.00 | 15.0 | 25.0 | 1.0 | 5.0 |
| 10 | 500.00 | 9.00 | 10.00 | 32.2 | 70.6 | 1.3 | 6.2 |
| 11 | 460.00 | 6.00 | 0.00 | 44.0 | 58.4 | 2.6 | 4.8 |
| 12 | 500.00 | 9.00 | 20.00 | 38.0 | 43.0 | 1.4 | 4.7 |
| 13 | 500.00 | 6.00 | 10.00 | 41.0 | 44.6 | 5.2 | 10.3 |
| 14 | 460.00 | 9.00 | 10.00 | 23.0 | 21.5 | 1.8 | 3.0 |
| 15 | 540.00 | 12.00 | 20.00 | 68.0 | 154.0 | 2.7 | 6.5 |
| 16 | 460.00 | 12.00 | 0.00 | 22.5 | 41.8 | 1.7 | 1.4 |
| 17 | 500.00 | 9.00 | 0.00 | 114.0 | 42.2 | 5.0 | 3.6 |
| 18 | 500.00 | 9.00 | 10.00 | 29.8 | 47.2 | 2.4 | 5.8 |
| 19 | 540.00 | 6.00 | 0.00 | | 38.2 | | 2.1 |
| 20 | 500.00 | 9.00 | 10.00 | 102.0 | 76.2 | 2.4 | 5.5 |

| Run | Response Crystallinity % | Response Spenser Impact PSI | Response Light Transm % | Thick Avg T inches | Response Thick Avg M inches |
|---|---|---|---|---|---|
| 1 | 33 | 1.04E+03 | 66.03 | 0.00694 | 0.00624 |
| 2 | 18.6 | 2.00E+03 | 90.30 | | 0.0013 |
| 3 | 23.5 | 2.06E+03 | 90.30 | 0.00114 | 0.0012 |
| 4 | 30.5 | 2.31E+03 | 87.80 | 0.00224 | 0.0021 |
| 5 | 15.5 | 1.77E+03 | 91.20 | 0.00194 | 0.00192 |
| 6 | 19.1 | 1.11E+03 | 89.64 | 0.00194 | 0.00216 |
| 7 | 19.2 | 2.43E+03 | 90.15 | 0.00216 | 0.00204 |

TABLE A-continued

Data Analysis of PET Sample

| | | | | | |
|---|---|---|---|---|---|
| 8 | 17.7 | 2.18E+03 | 90.78 | 0.0028 | 0.0031 |
| 9 | 31.5 | 1.11E+03 | 85.00 | 0.00245 | 0.0017 |
| 10 | 18.6 | 1.65E+03 | 90.26 | 0.00224 | 0.0021 |
| 11 | 24.1 | 1.25E+03 | 80.40 | 0.00216 | 0.00204 |
| 12 | 23.7 | 1.62E+03 | 88.97 | 0.00206 | 0.00176 |
| 13 | 22.8 | 1.65E+03 | 90.90 | 0.00082 | 0.00072 |
| 14 | 30.9 | 1.00E+03 | 86.46 | 0.00204 | 0.00165 |
| 15 | 16.5 | 1.78E+03 | 90.30 | 0.00143 | 0.00164 |
| 16 | 29.5 | 1.35E+03 | 87.80 | 0.00115 | 0.00118 |
| 17 | 16.2 | 2.28E+03 | 91.20 | 0.00102 | 0.00124 |
| 18 | 25.3 | 1.67E+03 | 88.03 | 0.00182 | 0.00164 |
| 19 | 11 | 1.65E+03 | 89.91 | | 0.00294 |
| 20 | 22.4 | 1.86E+03 | 88.40 | 0.00194 | 0.0017 |

In TABLE A, the column heading "Ten T Elong" refers to tensile elongation in the transverse direction. The phrase "Ten M Elong" refers to tensile elongation in the machine direction. The column headings "TS TD" and "TS MD" refer to tensile strength in the transverse direction and tensile strength in the machine direction, respectively. The column headings "Thick Avg T" and "Thick Avg M" refer to average thickness in the transverse direction and average thickness in the machine direction, respectively. The column heading "Spencer Imp" is Spencer Impact Procedures for determining percent crystallinity are set forth in the ANALYTICAL discussion below.

Example 2

Another set of experiments was conducted on a small blown film line. TABLE B reports conditions and results.

TABLE B

| Firm Sample | Adapter Temperature (° F.) | $T_m$(° C.) | Melting Enthalpy (J/g) | Mass Crystallinity[2] (wt/%) | $1^{st}$ Recrystallation Enthalpy (J/g) | ASTM D 1003-95 Total Transmission (%) | ASTM D 1003-95 Haze (%) | ASTM D 1746-92 Clarity (%) |
|---|---|---|---|---|---|---|---|---|
| Control - DuPont Mylar ™ PET Film, 1.2 mil | | 262 | 44 | 32 | N/A | 89.3 | 0.2 | 67.4 |
| ICI Mellinex ™850 PET Film | | 260 | 35 | 25 | N/A | 92.9 | 1.1 | 80.0 |
| WCD 641 | | 254 | 23 | 17 | −14.17 | 91.3 | 9.7 | 15.3 |
| WCD 642 | | 256 | 11 | 8 | −25.7 | 92.3 | 1.2 | 29.5 |
| WCD 643 | | 254 | 18 | 13 | −19.89 | 92 | 2.4 | 34.9 |
| WCD 644 | | 255 | 30 | 22 | −10.28 | 91.8 | 5.5 | 12.1 |
| WCD 645 | 562 | 257 | 22 | 16 | −20.75 | 92.3 | 2.3 | 44.6 |
| WCD 646 | 541 | 256 | 14 | 10 | −26.09 | 92.3 | 0.9 | 35.0 |
| WCD 647 | 532 | 255 | 17 | 12 | −22.84 | 91.9 | 2.9 | 28.9 |
| WCD 648 | 520 | 252 | 23 | 17 | −15.53 | 91.4 | 8.1 | 14.7 |
| WCD 649 | 513 | 256 | 27 | 20 | −8.206 | 89.5 | 56.6 | 0.0 |
| WCD 650 | | 257 | 28 | 20 | −4.845 | 90.3 | 55.8 | 0.0 |

| Firm Sample | Oxygen Permeability at 73° F. and 0% RH (cm³-mil/m²-day atm) | Oxygen Permeability at 73° F. and 100% RH (cm³-mil/m²-day atm) | MD Shrinkage Stress at 230° F. (psi) | TD Shrinkage Stress at 230° F. (psi) | Static COF Film/SS | Kinetic COF Film/SS | MD Young's Modulus at 23° F. (psi) | TD Young's Modulus 23° F. (psi) | |
|---|---|---|---|---|---|---|---|---|---|
| Control - DuPont Mylar ™ PET Film, 1.2 mil | 73.90 | 49.79 | 0.0 | 73.6 | 0.387 | 0.284 | 67319 | 88235 | 67319 |
| ICI Mellinex ™850 PET Film | 85.00 | 53.89 | 160.9 | 178.7 | 0.58 | 0.417 | 65552 | 64926 | 65552 |
| WCD 641 | 173.71 | 108.17 | 0.0 | 0.0 | 0.358 | 0.31 | 42074 | 41525 | 42074 |
| WCD 642 | 208.30 | 135.56 | 160.9 | 0.0 | 0.333 | 0.282 | 35827 | 35916 | 35827 |
| WCD 643 | 191.45 | 118.46 | 0.0 | 0.0 | 0.405 | 0.343 | 36221 | 33822 | 36221 |
| WCD 644 | 221.04 | 125.28 | 0.0 | 0.0 | 0.388 | 0.31 | 35865 | 29461 | 35865 |
| WCD 645 | 210.71 | | 0.0 | 0.0 | 0.44 | 0.359 | 36403 | 40121 | 36403 |
| WCD 646 | 207.49 | | 94.2 | 0.0 | 0.433 | 0.372 | 35718 | 34218 | 35718 |
| WCD 647 | 206.44 | | 0.0 | 0.0 | 0.465 | 0.403 | 34335 | 36616 | 34335 |
| WCD 648 | 178.26 | | 0.0 | 0.0 | 0.405 | 0.309 | 39588 | 38737 | 39558 |
| WCD 649 | 175.53 | | 0.0 | 0.0 | 0.351 | 0.227 | 37452 | 37752 | 37452 |
| WCD 650 | 181.55 | | 0.0 | 0.0 | 0.323 | 0.242 | 38505 100000 | 34682 | 38505 100000 |

The blow-up ratios ranged from 3:1 ti 4:1 in the runs reported in TABLE B. Extruded monolayer poly(ethylene) terephthalate (PET) films were prepared for the purpose of evaluating the effect of die adapter temperature on the induction of stress-induced crystallization in the PET film. The physical properties of the experimental films produced were compared to commercial biaxially stretched PET films

ANALYTICAL WORK

To determine the amount of crystallinity with Differential Scanning Calorimetry, a sample was heated at 10° C./minute. At a temperature above, the glass transition temperature (Tg), the sample crystallizes and the heat transferred in this process ($\Delta H_c$) is measured. As the temperature approaches the melting point, all the crystals formed are melted. The heat flow ($\Delta H_f$) for this process is also determined. The difference in $\Delta H_f$ and $\Delta H_c$ is the heat required to melt any crystals formed in the experiment itself, before the Differential Scanning Calorimetry measurement, thus making $\Delta H_f$ (greater than $\Delta H_c$ for samples evidencing crystallization.

The percent crystallinity is calculated using the following formula:

$$(\Delta H_{f-\Delta Hc})/\Delta H\infty$$

where:

$$\Delta H\infty = 125.58 \text{ J/g for 100\% crystalline PET.}$$

For one amorphous sample, the percent crystallization was calculated as follows:

$$(43.13-35.34)/125.58=6.2$$

For a crystallized specimen, the percent crystallization is:

$$(38.42-17.91)/125.58=16.3\%.$$

As discussed above, the mass percentage crystallinity for each sample was calculated from the first heating data by subtracting the exothermic crystallization enthalpy from the final endothermic melting enthalpy and dividing the result by 125.58 J/g, the melting enthalpy for a perfect PET crystal, according to Progelhoff et al, "Polymer Engineering Principles:Process and Tests Design", C. Hanser Publishers, New York (1993).

The following procedures were also used.

PROCEDURE I: Isothermal DSC Procedure
Preparation of a Sample for Kinetic Measurements
A 4–8 mg sample of CPET is heated to 300° C. in the DSC cell in order to homogeneously melt all crystals and erase any memory of previous processing.
Isothermal Crystallization
The sample is then cooled as quickly as possible (@200° C./min.) to a crystallization temperature ($T_c$) and held at this constant temperature for 30 minutes during which the crystallization process is monitored. The DSC records heat evolved as the sample crystallizes.

The heat evolved during crystallization reaches a maximum at a time ($t_{0.5}$) which is the half time of crystallization, a rough estimate of the time required to produce 50% of the total crystallinity possible at this crystallization temperature. The half time of crystallization increases (i.e. decreasing rate of crystallization) for increasing $T_C$. The rate of reaction for traditional organic reactions increase by a factor of 2 for every 10° C. increase in temperature. The rate of crystallization of polymers decreases by $10^4$ for the same 10° increase in $T_C$. This exceptionally large negative temperature coefficient of the rate of crystallization is the result of homogenous nucleation by small random generation of small crystalline seeds from which polymer crystals grow to completion.

Integration of the total area under the heat vs. time curve yields $\Delta H_c$ (cal/g) a measure of the total % crystallinity produced in the sample. The DSC software also provides for partial area integration which calculates the portion of $\Delta H_c$ achieved at any time during crystallization process. This partial area integration generates a trace of % crystallinity vs. time which reflects the actual kinetics of crystallization process.
Melting of Sample after Isothermal Crystallization After isothermal crystallization for 30 minutes, the sample is quenched (cooled @200° C./min.) to 20° C. During the subsequent heating from 20° C. to 300° at 10° C./min., six characteristic variables reflecting PET crystallization rate, crystal structure, and transition temperatures are recorded:
(1) Glass Transition Temperature ($T_g$)

The glass transition temperature ($T_g$) which is the temperature at which the non-crystalline, amorphous PET transforms from a hard, glassy, brittle material to a soft, rubbery material.
(2) Heat of Recrystallization ($\Delta H_{rc}$) and Recrystallization Temperature ($T_{C,H}$)

The heat of recrystallization ($\Delta H_{rc}$) is the heat generated by regions of non-crystalline, amorphous, rubbery PET which spontaneously crystallizes as the sample is heated during the DSC analyses. This crystallization is often called the crystallization from the glassy state which is somewhat of a misnomer. A glassy material can not crystallize. Crystallization occurs only at temperatures above the $T_g$ with rubbery materials. The temperature at which this recrystallization proceeds at the maximum rate is designated as the recrystallization temperature ($T_{C,H}$). For isothermal crystallization, $\Delta H_{rc}$ is not typically observed as the crystallization process is allowed to proceed to maximum % crystallinity. The presence of $\Delta H_{rc}$ indicates that the sample would only partially crystalline.
(3) Total Heat of melting ($\Delta H_{m, total}$) and Crystalline Melting Temperature ($T_m$)

The total heat of fusion or melting ($\Delta H_{m,total}$) is the combined beat of melting all crystalline PET either induced by recrystallization during the DSC test as well as those produced by the primary, isothermal crystallization process. The crystalline melting temperature ($T_m$) is the temperature at which the PET crystals melt from a rigid, 3-dimensional, ordered array to a disordered, flexible, molten mass.
(4) Heat of Melting ($\Delta H_m = \Delta H_{m,total} - \Delta H_{rc}$)

The heat of melting or fusion ($\Delta H_m = \Delta H_{m,total} - \Delta H_{rc}$) is the heat of melting of only the PET crystallized during the primary, isothermally crystallization process. The % crystallinity created in the original isothermally crystallized sample is proportional to the $\Delta H_m$ parameter.

PROCEDURE II: Dynamic DSC Procedure
Preparation of a Sample for Kinetic Measurements
A CPET sample is prepared by quenching a thin extruded strip directly into cold water. Quenching generates a thin amorphous film containing little to no crystallinity. This film is in the "glassy" state at room temperature (i.e. at a temperature below the Tg). A 4–8 mg sample is placed in the DSC for thermal analysis.
Dynamic Crystallization During Heating from the Glassy State During the heating from 29° C. to 287° at 10° C./min., six characteristic variables reflecting PET crystallization rate, crystal structure, and transition temperatures are recorded:
(1) Glass Transition Temperature (Tg)

The glass transition temperature (Tg) is the temperature at which the non-crystalline, amorphous PET transforms from a hard, glassy, brittle material to a soft, rubbery material. Plasticizers depress glass transition temperature (Tg) monotonically with % composition just like salt depresses the freezing temperature of water. The rate of polymer crystallization depends on Tg of the polymer among a number of other variables. Depressing the Tg accelerates the rate of crystallization.

(2) Heat of Recrystallization ($\Delta H_{rc}$) and Recrystallization Temperature ($T_{C,H}$)

The heat of recrystallization ($\Delta H_{rc}$) is the heat generated by regions of non-crystalline, amorphous, rubbery PET which spontaneously crystallize as the sample is heated during the DSC analyses. This crystallization is often called the crystallization from the glassy state which is somewhat of a misnomer. A glassy material can not crystallize. Crystallization occurs only at temperatures above the Tg with rubbery materials. The temperature at which this recrystallization proceeds at the maximum rate is designated as the recrystallization temperature ($T_{C,H}$). The numerical value of $T_{C,H}$ reflects the rate at which an amorphous sheet of PET can be thermoformed into crystalline products. Nucleating agents and plasticizers accelerate the rate of crystallization from the "glass" which is reflected by lower values for $T_{C,H}$. Since the crystallization rate is faster, crystallization will begin and maximize at lower temperatures for nucleated or plasticized PET compositions.

(3) Total Heat of melting ($\Delta H_{m,total}$) and Crystalline Melting Temperature ($T_m$)

The total heat of fusion or melting $\Delta H_{m,total}$) is the combined heat of melting all crystalline PET either induced by recrystallization during the DSC test as well as those produced during quenching of the film (if any). The crystalline melting temperature ($T_m$) is the temperature at which the PET crystals melt from a rigid, 3-dimensional, ordered array to a disordered, flexible, molten mass.

(4) Heat of Melting ($\Delta H_m = \Delta H_{m,total} - \Delta H_{rc}$) The heat of melting or fusion ($\Delta H_m = \Delta H_{m,total} - \Delta H_{rc}$) is the heat of melting of only the PET crystallized during quenching of the film. For a perfectly quenched film $\Delta H_{m,total}$ and $\Delta H_{rc}$ are identical.

Dynamic Crystallization during Cooling from the Molten State

After the DSC heating cycle has been completed, allow the sample to remain at 287° C. for 2 minutes to completely erase any memory of previous crystallinity. Start to cool the sample back to 29° C. at 10° C./min. and monitor the process of crystallization from the molten state. The heat emitted during crystallization will be evidenced as the inverse peak of the melting peak. During the cooling cycle, three characteristic variables reflecting PET crystallization rate, crystal structure, and transition temperatures are recorded:

(1) Total Heat of Crystallization ($\Delta H_c$) and Crystallization Temperature ($T_{C,C}$)

The heat of crystallization ($\Delta H_c$) is the heat evolved during the dynamic crystallization of PET from the molten state and is measured by the integration of the area under the heat vs. temperature curve. ($\Delta H_c$) is proportional to % crystallinity. The crystallization temperature ($T_{C,C}$) is the temperature at which the rate of crystallization of PET from the molten state is maximum.

(2) Glass Transition Temperature (Tg)

The glass transition temperature (Tg) measured during cooling is the temperature at which the soft, rubbery PET transforms to a hard, glassy, brittle material. The step function shape of this first order transition is in the reverse direction of the glass transition recorded during a heating cycle. In an ideal world carrying out DSC traces at infinitely slow rates, the glass transition temperatures would be identical from heating or cooling cycles. In the real world of physical measurements at finite heating and cooling rates, Tg values will vary between heating and cooling cycles. However, the plasticizer depression of Tg occurs for Tg measured during heating or cooling—only the absolute values vary.

For injection molding PET compounds, the value of $T_{C,H}$ is often used as a predictor of the fast rates of crystallization required by the short time cycle in an injection molding process. Actually, a difference of more than 110° C. between $T_{C,C}$ and $T_{C,H}$ has been reported to be the more fundamental predictor of whether a compound can be injection molded or not. However, $T_{C,H}$ is more sensitive changing rates of crystallization than $T_{C,C}$ which explains why $T_{C,H}$ is often used as a single predictor. However, it only takes a few more minutes to run both heating and cooling cycles which gives both parameters.

It is important to note that this type of analyses is meaningful only if and only if the initial heating cycle is performed using quenched films. Partially quenched materials reflect the heterogeneous nucleation from pre-existing crystallites rather than the inherent tendency for a material to crystallize from the "glassy" state or from the molten state.

The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. A method of increasing the crystallinity of polyethylene terephthalate comprising:

melting substantially amorphous polyethylene terephthalate in an extruder having an adapter tube with a restricted portion;

cooling said melted polyethylene terephthalate in the adapter tube to crystallize said polyethylene terephthalate;

heating said cooled polyethylene terephthalate to a temperature less than the melting point of said cooled and heated polyethylene terephthalate; and processing said heated polyethylene terephthalate.

2. The method of claim 1, which comprises cooling the melted PET by decreasing the temperature applied to the melt by at least 10° C. and up to about 38° C. so that the applied temperature is in the range of 229° C. to 285° C.

3. The method of claim 1, which comprises heating the crystal containing PET to a temperature of over 260° C. to a temperature less than the PET melting point.

4. A method of producing polyethylene terephthalate films, comprising:

melting polyethylene terephthalate in an extruder having an adapter tube with a restricted portion;

cooling said melted polyethylene terephthalate in the adapter tube to crystallize said polyethylene terephthalate by decreasing the temperature applied to the melt by at least 10° C. and up to about 38° C. so that the applied temperature is in the range of 229° C. to 285° C.;

heating said cooled polyethylene terephthalate to a temperature less than the melting point of said cooled polyethylene terephthalate; and blowing said heated polyethylene terephthalate into a film.

5. A method of increasing the oxygen barrier properties of polyethylene terephthalate, comprising:

melting polyethylene terephthalate in an extruder having a restricted portion between upstream and downstream unrestricted portions;

cooling said melted polyethylene terephthalate in the restricted portion of the extruder
by decreasing the temperature applied to the melt by at least 10° C. and up to about 38° C. so that the applied temperature is in the range of 229° C. to 285° C.;

heating said cooled polyethylene terephthalate to a temperature less than the melting point of said cooled polyethylene terephthalate; and blowing said heated polyethylene terephthalate into a film.

6. A process for increasing the crystallinity of polyethylene terephthalate which comprises subjecting amorphous PET to heating at a temperature which exceeds 254° C.; and crystallizing the heated PET, by simultaneously cooling the heated PET by decreasing the temperature applied to the melt by at least 10° C. and up to about 38° C. so that the applied temperature is in the range of 229° C. to 285° C.; and passing the PET, while said PET is being cooled, to an adapter which has an aspect ratio, defined as L/D wherein L is length and D is diameter and wherein the L/D has a numerical ratio of 16 to 21; and subjecting the PET to a pressure of 1500 to 6200 psi, to form PET with a crystal content of 5 to 40%; and heating the crystal containing PET to a temperature of over 260° C. to a temperature less than the PET melting point.

* * * * *